Figure 1:
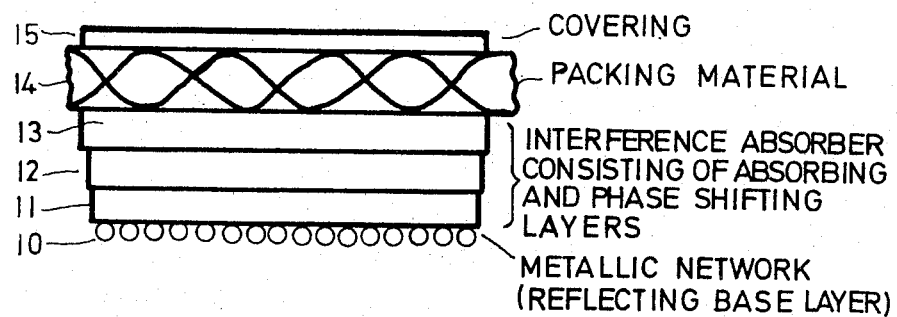

April 18, 1967  L. WESCH  3,315,260
NON-METALLIC PACKAGING MATERIAL WITH RESONANCE
ABSORPTION FOR ELECTROMAGNETIC WAVES
Filed Dec. 19, 1961  3 Sheets-Sheet 1

- 15 — COVERING
- 14 — PACKING MATERIAL
- 13, 12, 11 — INTERFERENCE ABSORBER CONSISTING OF ABSORBING AND PHASE SHIFTING LAYERS
- 10 — METALLIC NETWORK (REFLECTING BASE LAYER)

INVENTOR:
LUDWIG WESCH
BY Kurt Kelman
Agent

United States Patent Office 3,315,260
Patented Apr. 18, 1967

3,315,260
NON-METALLIC PACKAGING MATERIAL WITH RESONANCE ABSORPTION FOR ELECTROMAGNETIC WAVES
Ludwig Wesch, Schlosswolfsbrunnenweg 10, Heidelberg, Germany
Filed Dec. 19, 1961, Ser. No. 161,337
Claims priority, application Germany, Jan. 15, 1957, D 24,707
6 Claims. (Cl. 343—18)

This is a continuation-in-part of my application Ser. No. 709,139, filed Jan. 15, 1958, now abandoned.

The present invention relates to a packaging material camouflaging packed goods against radar detection.

Metallic objects, such as cans, containers and other metallic articles, are usually packed in crates, boxes or baskets of cardboard, wood, fiberboard, reticulated structures and the like. If such packed goods are stored outside, they constitute a perfect radar target and can be easily detected on a radar screen, particularly if the waves are in the range between 0.1 cm. and 50 cm., usually 0.8–8 cm. Large piles of goods may be detected by waves above 10 cm. length.

One type of known resonance absorbers for absorbing impinging electromagnetic waves by wave interference consist of an outer boundary layer having an input wave impedance of 377 ohms and being spaced at a distance of $\lambda/4$ from a reflecting base layer. A part of an impinging wave beam is reflected on this boundary layer and another part of the beam penetrates through the boundary layer, is reflected on the base layer and leaves the absorber passing the boundary layer again. The beam part reflected on the boundary layer interferes with the beam part leaving the absorber and when the beam parts have equal amplitude and their magnetic and electric fields are out of phase by 180°, the two beam parts cancel each other. The ratio of the beam part reflected on the outer boundary layer and of the beam part penetrating into the absorber varies in dependence on several factors. Because of this variation, the amplitudes of both, the part reflected on the outer boundary layer and the part leaving the absorber after having been reflected on the base layer, differ and this fact results in only part of the wave beam impinging on the absorber being absorbed.

Said variations are caused e.g. by high high-frequency losses within the absorber which decrease the amplitude of the wave beam part passing through the absorber. For balancing the amplitude of both the wave beam part reflected on the outer surface and the wave beam part passing through the laminate, the high-frequency losses within the absorber may be made very low. This can be achieved by providing a very thin 377 ohms layer and by providing a spacing layer consisting of a material having low high-frequency losses. These materials having low high-frequency losses, such as foamed plastics and the like, have also a very low stability. If such an absorber laminate is applied to the outer surface of a packaging material sheet, it may be easily damaged or unfavorably influenced by the atmosphere. Other known materials having relatively low high-frequency losses have also a substantially lower stability and substantially higher sensibility to atmospheric influences than the usual packaging materials. Moreover, with low high-frequency losses displacements of the amplitudes occur, which causes an incomplete absorption of the waves impinging on the absorber.

The man skilled in the optical art knows a so-called "delustering layer," e.g. for objectives in cameras, which decreases the reflection on the outer surface of the lens. Similarly to a "delustering layer," a surface impedance matching layer may be constructed which decreases the reflection of electromagnetic waves, especially high-frequency electromagnetic waves, on the outer surface of an absorber.

It is the principal object of my present invention to provide packaging means which has properties equal to usual packaging materials at least on its outer surface and which camouflage the packed goods against radar detection.

It is another object of this invention to provide a radar camouflage packaging material which may also camouflage the packed objects against visual and/or infra-red wave detection.

In accordance with my present invention, the packaging material sheet itself is used as a surface impedance matching layer for decreasing the input wave impedance of any desired resonance absorber, e.g. as described in U.S. Patent No. 2,599,944, granted on June 10, 1952 to W. W. Salisbury, U.S. Patent No. 2,656,535, granted on Oct. 20, 1953 to L. K. Neher, or my U. S. patent applications Ser. No. 86,823, filed on Feb. 2, 1961, and Ser. No. 86,824, filed on Feb. 2, 1961.

Also, a surface impedance matching layer consisting of a packaging material sheet may be used with any other absorber for electromagnetic waves where an increase of the wave beam part penetrating into the absorber is essential. If possible, the materials and the dimensions of the absorbing layer are chosen so that they improve the mechanical properties of the packaging material.

As explained in my application Ser. No. 86,823, a surface impedance matching layer must have an impedance between somewhat below 377 ohms and above the impedance of the next following layer of the underlying absorber to transform the impedance of free space in the direction of the reflecting base of the absorber to the impedance of the surface boundary layer of the absorber. The absorber should show relatively good absorption characteristics in a broad wave band. Since the goods are usually stored outside, the degree of absorption depends on the reflection of the surrounding area in which the goods are stored. The attenuation should be at least 5 db, maximally between 10 and 30 db.

For carrying out the invention, absorber laminate is applied to the rear face, relatively to the impinging waves, of a packaging material sheet having an input wave impedance between the wave impedance of free space and the input wave impedance of the outer boundary layer of the absorber laminate. Onto the surface of the packaging material sheet facing the impinging waves any usual covering protecting the sheet against atmospheric influences, such as moisture, dust or the like, may be applied or a covering camouflaging the package against optical or infrared detection. Preferably, the protective or camouflaging covering has an input wave impedance which is lower than the input wave impedance of the packaging material.

The packaging material useful for the purposes of the present invention may be any conventional fibrous packaging material, such as wood, cardboard or other cellulosic sheet material, sheet materials of synthetic fibers, baskets made of any such fibrous materials and the like. All these materials have a dielectric constant so low as to be negligible in comparison to the high dielectric constants of the absorbers with which they are combined in accordance with this invention.

The relative dielectric constant in the given wave range of 0.1 to 50 cm., preferably 0.8–8 cm., of cellulose or wooden sheets, for instance, is between 2 and 6 while the apparent dielectric constants at least of the outer boundary layer of the absorbers, namely the products of the relative dielectric constant ($k'$) and permeability ($k_m'$) are above 10, mostly 25–100 and often as high as 400. Therefore, the dielectric constant of the packaging material per se lies one or two orders of magnitude below the apparent dielectric constant ($k' \times k_m'$) of the absorber. The losses of the packaging material also lie below the losses of the absorber layer.

A surface impedance matching layer has the characteristic that its refractive index equals the geometric mean of the refractive indices of the two neighboring media between which it lies. If a layer meets this condition, there is a markedly decreased reflection at its outer surface and radiated energy will penetrate therethrough to the medium below practically without losses. In order to secure complete wave absorption, such a surface impedance matching packaging material sheet should be superimposed over an absorber whose outer boundary face has a distance $b$ from the reflecting base equal to $$(2n-1)\lambda/4 \text{ or } (2n-1)\lambda/4\sqrt{k'k_m'}$$

wherein $\lambda$ is the wavelength in the material, $k'$ is the relative dielectric constant, $k_m'$ is the relative permeability, and $n$ is any positive integer. The refractive index of the packaging material sheet should be $$r = \sqrt{r_1 \cdot r_2} \quad \text{(I)}$$

wherein $r$ = the refractive index of the packaging material sheet,
$r_1$ = the refractive index of the material on the outer surface of the packaging material (air when no covering is applied),
$r_2$ = the refractive index of the material on the inner surface of the packaging material (boundary layer of the absorber).

Figure 3:
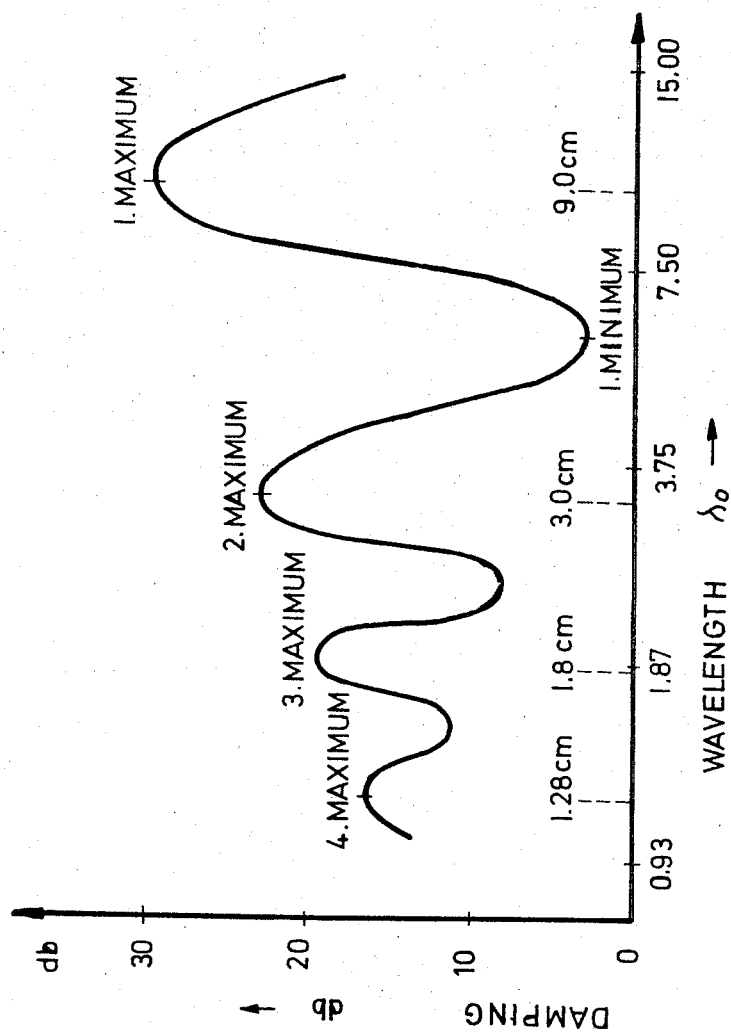

The surface impedance matching layer is preferably tuned to one of the shorter wavelengths of the frequency band, e.g. to the second maximum, as illustrated in FIG. 3. As may be seen in FIGS. 3 and 4, the harmonics of the main wavelength, i.e. the second, third etc. maximum has a decreasing attenuation. This decreased attenuation of the shorter waves of the frequency band may be increased by the surface impedance matching layer. According to my invention, it is possible to increase the attenuation of the second maximum by 5 to 15 db, usually about 10 db, by tuning the matching layer to the wavelength according to the second maximum.

Tuning the matching layer as described to a harmonic of the main wavelength results in a smaller thickness of said matching layer so that the main wavelength is not influenced by the matching layer and the reflection in the whole frequency band is more uniform.

The absorber may be applied to the inner surface of the packaging material sheet by an adhesive. Since absorbers such as described in my abovementioned application Ser. No. 86,823 are effective in a very wide frequency band and since it may not be critical in many cases to eliminate all reflection, i.e. a residual reflection may be tolerable, the thickness of the absorber need not exactly follow the abovementioned formula $$h = (2n-1)\lambda/4 \text{ or } (2n-1)\lambda/4\sqrt{k'k_m'}$$

Figure 4:
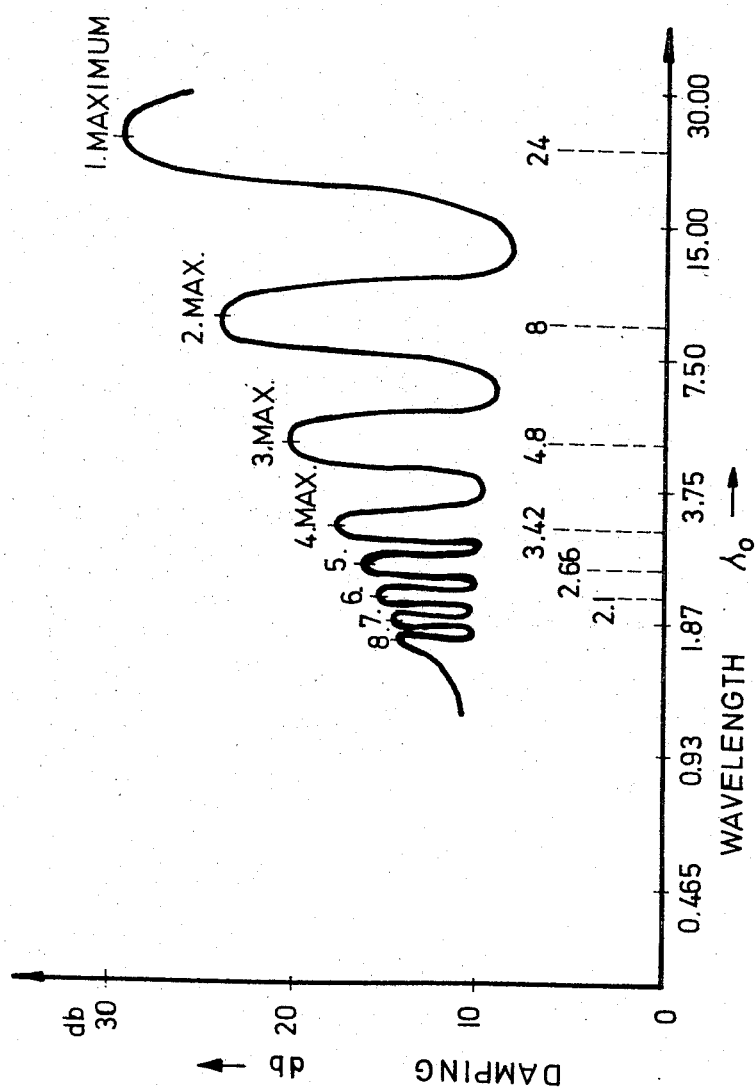

To facilitate the understanding of the invention and merely as an exemplary illustration thereof, the accompanying drawing is made a part of this description. In the drawing, FIG. 1 is a transverse section showing a laminated packaging material according to my present invention; and FIGS. 2–4 illustrate attenuation characteristics of the packaging material absorbing electromagnetic waves according to my present invention.

Figure 2:
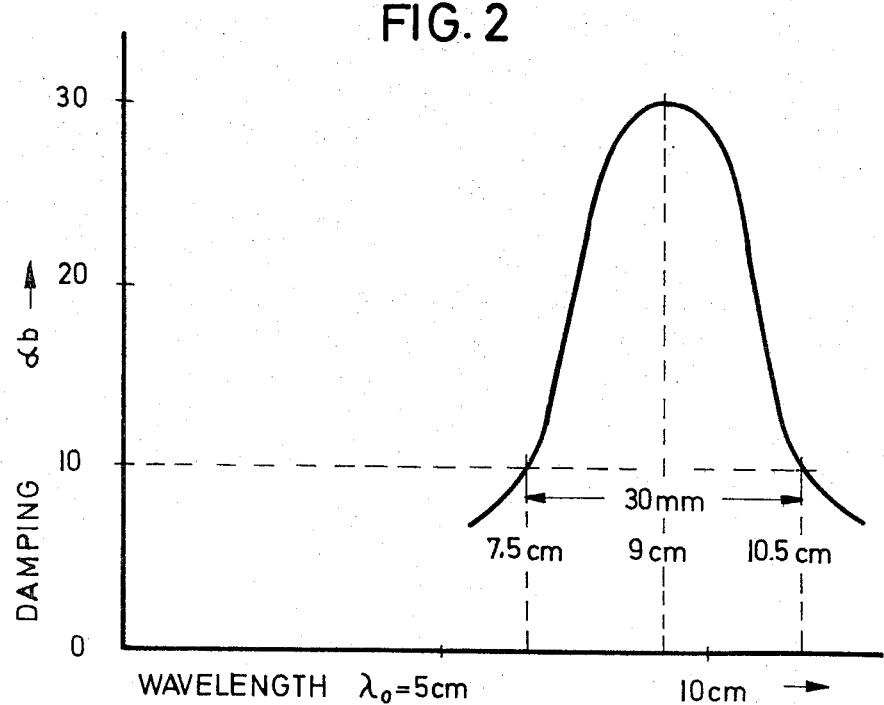

Referring now to FIG. 1, 14 designates a fibrous packaging material sheet used as a surface impedance matching layer.

Layer 14 is a sheet of wood having a thickness of 15 mm. and having $k'=3.25$ and $k_m'=1.0$, $\tan \delta_d = 0.05$ and no $\tan \delta_m$, $\tan \delta_d$ being the dielectric loss tangent and $\tan \delta_m$ being the magnetic loss tangent.

Instead of the sheet of wood any usual packaging material, such as pulp, cardboard or the like, may be used.

The resonance absorber is of the type described in my abovementioned U.S. application 86,823 and consists of reflecting base layer 10 carrying absorbing and phase-shifting layers 11, 12 and 13, each of which may be constituted by a plurality of coatings. Layer 12 may be a supplemental phase-shifting coating and consist of a material having a dielectric constant ($k'$) of about 1.5 to 10 and a relative dielectric loss angle tangent $\tan \delta_d$ less than 0.1. The layer 14 carries a protective covering 15 to protect the packaging material against moisture, corrosion, etc. The thickness of the entire packaging material may be about 6 to 8 mm., the fibrous packaging material sheet itself representing about one-half of the total thickness.

FIG. 2 shows an attenuation curve. The attenuation values in decibels are entered on the ordinate, whereby 0 db = 100% reflection. The wavelengths are entered on the abscissa. As shown, in the range of 9 cm. wavelength, the attenuation curve has the shape of a bell. Attenuation values of 10 db are usually considered sufficient under most practical camouflaging conditions and higher values give excellent attenuation.

On the basis of the bell shaped attenuation curve it is possible to define the band width, within which the absorber will perform satisfactorily, for instance at 10 db, by defining the points where the curve crosses the line of 10 db. In the illustrated example of FIG. 2 attenuation as high as 10 db is attained for a band having a width of 30 mm.

It is possible to obtain wave interference with different harmonics for a predetermined absorber thickness. This makes it possible to cover a whole band with attenuation maxima and interposed attenuation minima. As illustrated in FIG. 3, for instance, a band of 0.5 to 15 cm. wavelength can be absorbed with an absorber of constant thickness although the major attenuation points may be spaced apart at different wavelengths. With the known constants, the major point of effectiveness of the absorber, i.e. its first attenuation maximum, may be determined so that the desired result is obtained. In this respect, there are three possibilities:

(1) The wavelength of the first attenuation maximum coincides with the longest wave of the band to be absorbed.

(2) The wavelength of the first attenuation maximum lies between about 30 to 50%, or an average of 40%, below the length of the longest wave.

(3) The wavelength of the first attenuation maximum lies between about 40 to 100%, preferably about 60%, above the length of the longest wave. If the thickness of the absorber is of no practical concern, the third possibility is preferred.

From FIG. 3 it will be seen that the attenuation maxima of the harmonics are closely adjacent in the range of the shorter waves and that there is a wide zone in which the residual reflection is still tolerable.

An absorber having a thickness of 0.25 cm. and having high-frequency constants $k' \cdot k_m' = 81$ has a first maximum for a main wavelength $\lambda_0 = 9$ cm.

However, as noted, there is high reflectivity at the first attenuation minimum of the absorber embodiment of FIG. 3. Therefore, the third possibility illustrated in FIG. 4 is preferred, wherein the first attenuation maximum is so chosen that it lies above the longest wave to be absorbed, i.e. above 15 cm. This can be done, for instance, if the thickness $h$ of the absorber is 2/3 cm. In this case, maximum attenuation will coincide with the following wavelengths:

$\lambda_{o1}=24$ cm., for $n=1$
$\lambda_{o2}=8$ cm., for $n=2$
$\lambda_{o3}=4.8$ cm., for $n=3$
$\lambda_{o4}=3.42$ cm., for $n=4$, etc.

As FIG. 4 shows, considerably more attenuation maxima are obtained which are grouped about a median attenuation value if higher harmonics are taken.

As shown in FIG. 1, the absorbing coating consisting of layers 10 to 13 is bonded to the inside surface of the packaging material sheet 14 whereon the radar waves to be absorbed are impinged.

The inner surface of the laminate, which faces the packed goods, must be metallized, the impinging radar wave beam which penetrates in the absorber being reflected by the metallic layer 10 back into the absorber. This reflected wave interferes as described above at the outer surface of the absorber with the wave reflected at this surface.

The metallized layer 10 may be produced by any conventional process of providing metal coatings or films. By way of example, it may be found most practicable to spray the inner surface of the layer 11 with a metal lacquer containing, for instance, zinc, bronze, copper, aluminum or silver powder.

The layers or coatings, except the metallized layer 10 and the packaging material layer 14, hereinabove or hereinafter described may consist of binder masses filled with inorganic powders and applied by coating or spraying, for instance. The materials of the coatings may include synthetic resins, such as polymerization, condensation and addition products, and natural resins, natural rubber and bitumen, for instance as described in the abovementioned U.S. applications Ser. Nos. 86,824 and 86,823.

The Desmodur/Desmophen plastic materials mentioned in the examples are condensation products (manufactured by Bayer, Leverkusen, Germany) which condense after application with concurrent elimination of water. The Desmodur component is a diisocyanate. A considerable number of chemically different Desmophen components are commercially available, the mechanical strength of the lacquer depending essentially on the nature of the latter component. Following is an illustrative list of the Desmophen esters of adipic acid:

Desmophen 200=3 adipic acid+phthalic acid+8 1,2,4-butanetriol,
Desmophen 300=3 adipic acid+4 1,2,4-butanetriol +1 xylene formaldehyde resin,
Desmophen 800=5 adipic acid+1 phthalic acid+8 1,2,4-butanetriol,
Desmophen 900=3 adipic acid+4 1,2,4-butanetriol,
Desmophen 1100=3 adipic acid+2 1,2,4-butanetriol +2 butylene glycol,
Desmophen 1200=3 adipic acid+1 1,2,4-butanetriol + butylene glycol.

Other Desmophen products are manufactured under different symbols connected with the trade name "Desmophen" by the abovementioned firm.

The condensation products containing the Desmophen components become increasingly softer the higher the characteristic number of the Desmophen. The reaction between the Desmophen and Desmodur components is a two-step process, the hydroxy radicals first reacting with the isocyanate to form urethanes under elimination of water and the excess isocyanate then reacting with the water formed in the first step to separate $CO_2$, whereby a foam-like substance is formed. Furthermore, the excess isocyanates may form thermoplastic substances with glycols.

As will be clear from the above, softer or harder coatings may be produced, for instance, by choosing a suitable Desmophen, the harder coatings generally resulting in somewhat more brittle lacquer layers which may tear or break more easily.

Other suitable binder materials are known in the art and are described, for instance, by v. Hippel in "Dielectric Materials," published by the Technology Press of M.I.T., and John Wiley & Sons, Inc., New York, 1954.

Other useful binder materials include bitumen which may be soluble, partly soluble or insoluble in carbon disulfide and may be largely saponifiable or largely unsaponifiable, as well as substances related to bitumen, such as tar or pitch obtained by synthetic decomposing distillation of natural substances; also, refining residues obtained by treating the caustic of the saponification of bitumen or tars, also rosin acids of all types. Furthermore, equivalent materials listed in ASTM are equally useful.

Additional useful binder materials are described in "Farben-, Lack- und Kunstsoff-Lexikon Knittel," Wissenschaftliche Verlagsgesellschaft, Stuttgart, Germany, 1951, pp. 117–123.

Binder masses useful for the absorbers of the present invention must have a dielectric constant between 1.5 and 10, preferably 5–6, and a dielectric loss angle below 0.1. These binder materials should have suitable mechanical properties to improve the quality of the packaging material, i.e. they should be wear-resistant, pliable and elastic to make them resistant to shock.

While in no way limiting the invention, the following examples illustrate some embodiments of packaging material laminates which camouflage goods packed therein against radar detection. The ranges of layer thicknesses and corresponding amounts of layer materials indicate the possibilities of using the material to absorb wavebands of shorter or longer wavelength and can readily be determined on the basis of the formulas given hereinabove. Weights of applied coatings are given per square meter and are dry weights. If thinners are used, the weights must be changed accordingly. It will also be obvious to the skilled in the art that the specific materials indicated may be replaced by any of the equivalent materials listed hereinabove to indicate the general range of packaging materials, metallizing substances, and base materials and fillers for the outer coatings.

*Example I*

A packaging material laminate according to my present invention absorbing impinging electromagnetic waves by interference is shown in FIG. 1 and may comprise the following material layers:

Layer 10 may be metallic lacquer, a metallic mesh or a metal foil or any equivalent material sheet reflecting electromagnetic waves. Layer 10 may also be a non-metallic sheet reflecting electromagnetic waves as described in my U.S. application Ser. No. 854,979, filed Nov. 23, 1959.

Layer 11 has a thickness of 0.3 mm. and consists of a compound of the following components:

5.92 parts by weight of a hydroxyl group containing polyester (manufactured under the trademark "Desmophen 600," by Bayer, Leverkusen, Germany).

23.6 parts by weight of a hydroxyl group containing polyester (manufactured under the trademark "Desmophen AP stabil," by Bayer, Leverkusen, Germany).

1.85 parts by weight of a chlorinated diphenyl resin (manufactured under the trademark "Clophen A 60," by Bayer, Leverkusen, Germany).

2.74 parts by weight of a xylene formaldehyde resin (sold under the trademark "Kunstharz XFN," by Bayer).

4.8 parts by weight butyl acetate 100%.

4.26 parts by weight ethyl acetate.

10.4 parts by weight toluene.

1.72 parts by weight cellulose nitrate wool (sold as "Wolle E 330," by Wolf & Co., Walsrode, Germany).
21.9 parts by weight barium sulfate.
5.75 parts by weight talc.
3.0 parts by weight carbon black.
13.22 parts by weight micro-talc.
0.69 part by weight mixture of silicon oil and xylene (10:90).

This "Desmophen" mixture is mixed in a ratio of 9:1 with a diisocyanate mixture (87 parts by weight of Bayer's "Desmodur L" and 13 parts by weight ethyl acetate). The high-frequency characteristics of this layer are $k'=4.46$, tan $\delta_d=0.04$.

Layer 12 has a thickness of 0.3 mm. and consists of a compound of the following components:

5.92 parts by weight of a hydroxyl group containing polyester (Bayer's "Desmophen 600").
23.6 parts by weight of a hydroxyl group containing polyester (Bayer's "Desmophen AP stabil").
1.85 parts by weight of a chlorinated diphenyl resin (Bayer's "Clophen A 60").
2.74 parts by weight of a xylene formaldehyde resin (Bayer's "Kunstharz XFN").
4.8 parts by weight butyl acetate 100%.
4.26 parts by weight ethyl acetate.
10.4 parts by weight toluene.
1.72 parts by weight cellulose nitrate sold as "Wolle E 330," by Wolf & Co.
29.5 parts by weight magesium carbonate.
0.79 part by weight mixture of silicon oil and xylene (10:90).

This "Desmophen" mixture is mixed in a ratio of 9:1 with a diisocyanate mixture (87 parts by weight of Bayer's "Desmodur L" with 13 parts by weight ethyl acetate). The high-frequency characteristics of this layer are $k'=3.3$ and tan $\delta_d=0.02$.

Layer 13 is preferably divided into three coatings. The first coating has a thickness of 2.5 mm. and consists of a compound of the following components:

7.4 parts by weight of a hydroxyl group containing polyester (Bayer's "Desmophen 600").
22.2 parts by weight of a hydroxyl group containing polyester (Bayer's "Desmophen AP stabil").
5.1 parts by weight ethyl acetate.
5.1 parts by weight butyl acetate.
5.1 parts by weight methyl glycol acetate.
5.1 parts by weight toluene.
56.0 parts by weight iron powder as sold as EN8i by Badische Anilin- und Sodafabrik, Ludwigshafen, Germany.

This "Desmophen" mixture is mixed in a ratio of 4:1 with a diisocyanate mixture (87 parts by weight of Bayer's "Desmodur L" and 13 parts by weight ethyl acetate). The high-frequency characteristics of this layer are $k'=13.7$, $k_m'=2.83$, tan $\delta_d=0.088$, and tan $\delta_m=0.425$. All values are given for a wavelength $\lambda_o$ from 9 cm.

The second coating has a thickness of 0.3 mm. and consists of a mixture similar to that of layer 11. The high-frequency characteristics are $k'=4.46$ and tan $\delta_d=0.04$.

The third coating has a thickness of 1.1 mm. and consists of a mixture of the following components:

7.4 parts by weight of a hydroxyl group containing polyester (Bayer's "Desmophen 600").
22.2 parts by weight of a hydroxyl group containing polyester (Bayer's "Desmophen AP stabil").
5.1 parts by weight ethyl acetate.
5.1 parts by weight butyl acetate.
5.1 parts by weight methyl glycol acetate.
5.1 parts by weight toluene.
56.0 parts by weight iron powder as sold as EN8i by Badische Anilin- und Sodafabrik, Ludwigshafen, Germany.

This "Desmophen" mixture is mixed in a ratio of 4:1 with a diisocyanate mixture (87 parts by weight of Bayer's "Desmodur L" and 13 parts by weight ethyl acetate). The high-frequency characteristics are $k'=12.44$, $k_m'=1.67$, tan $\delta_d=0.088$, and tan $\delta_m=0.425$.

Layer 13 may also consist of a single layer of any material having a product of the high-frequency characteristics $k' \cdot k_m' = 10$ to 400.

Layer 14 is a sheet consisting of cardboard material having a thickness of 0.4 mm. and a $k'=2.3$ and a tan $\delta_d=0.05$.

Layer 15 is a protective camouflaging layer with a thickness of 0.1 mm. covering the packaging material laminate, especially the packaging material sheet 14 against influences from the atmosphere, such as moisture, dust and the like. Layer 15 may consist of the compound of the following components:

5.92 parts by weight of a hydroxyl group containing polyester (Bayer's "Desmophen 600").
23.6 parts by weight of a hydroxyl group containing polyester (Bayer's "Desmophen AP stabil").
1.85 parts by weight of a chlorinated diphenyl resin (Bayer's "Clophen A 60").
2.74 parts by weight of a xylene formaldehyde resin (Bayer's "Kunstharz XFN").
4.8 parts by weight butyl acetate 100%.
4.26 parts by weight ethyl acetate.
10.4 parts by weight toluene.
1.72 parts by weight cellulose nitrate sold as "Wolle E 330" by Wolf & Co.
21.9 parts by weight barium sulfate.
8.75 parts by weight talc.
13.22 parts by weight micro talc.
0.69 part by weight mixture of silicon oil and xylene (10:90).

This "Desmophen" mixture is mixed in a ratio of 9:1 with a diisocyanate mixture (87 parts by weight of Bayer's "Desmodur L" and 13 parts by weight ethyl acetate). The high-frequency characteristics of this layer are $k'=3.32$ and tan $\delta_d=0.119$.

In this camouflaging layer 15 fillers may be embedded, said fillers being effective against optical and infrared detection.

*Example II*

A quarter wavelength resonance absorber packaging material was produced as follows (the wavelength being that of the wave in the material):

Plywood of 4 mm. thickness was used as the packaging material sheet. The thickness of the plywood may range between 2 and 10 mm., depending on the above indicated factors.

The outer surface of the plywood may be covered with a protective coating 15 which may also serve for visible and infrared radiation camouflaging. Preferably, this coating 15 consists of 125 g. of a 4:1 mixture of Desmodur/Desmophen, a range of 100 to 150 g. being suitable, and filled with 30% of magnesium silicate. The filler percentage may vary between 20 and 40% and other inorganic pigments of the desired color and infrared reflectivity may be used.

Layer 13 was sprayed onto the inner surface of the plywood and consists of 145 g. of (a) 9:1 mixture of Desmodur/Desmophen, a range of 110 to 180 g. being suitable, and (b) about 550 g. of the same Desmodur/Desmophen mixture containing about 70% of high-frequency iron powder of a grain size below three microns, a range of 450–650 g. of the mixture being suitable and the filler being variable between 50 and 85%.

Layer 12 consists of a first coating and five additional coatings interleaved between six insulating coatings. The first coating consists of 450 g. of the same Desmodur/ Desmophen mixture, a range of 350 to 550 g. being suitable. Two-thirds of the plastic mixture contained about 30% magnesium carbonate and ⅓ contained about 3% carbon black, a range of 20–40% of $MgCO_3$ and 1–5% carbon black being suitable.

Each of the five additional coatings consists of 3000 g. of the same Desmodur/Desmophen mixture containing 70% of high-frequency iron powder of a grain size between one and ten microns, 2000 to 4000 g. of the plastic and 50–85% of the filler being suitable.

The insulating coatings consist of felted cellulosic fibers of low density and high chemical and mechanical resistance. The insulating coatings had a thickness of about 1/10 mm., with a weight of about 35 g. per square meter. Insulating films of this type are well known and may consist of various synthetic fibers felted into a non-woven fabric. The entire laminate was bonded together with Desmodur/Desmophen but any other organic adhesive may be used.

Layer 11 was divided into two coatings, one of which consisted of the same binder material as layer 13 with a carbon black filler (1–5%) and the other one of 1100 g. of the same mixture with 30% magnesium carbonate, a range of 700–1400 g. of the plastic mixture and 20–40% of the filler being suitable.

As explained hereinabove in connection with the general description of Desmodur/Desmophen, the ratio between the two components depends on the desired hardness and resistance to wear. Thus, it may be varied between 9.5:0.5 and 7:3. It will be so chosen that elastic, soft and rubber-like layers are formed to provide a certain impact or shock proofing for the packed goods.

Finally, reflecting base layer 10 was formed by metallizing layer 11 with aluminum lacquer (300 g. per square meter, a range of 100–600 g. being suitable). Alternatively, a metallic film may be bonded to the inner surface of the absorber laminate. Preferably, the metallic reflector was provided with grooves or other recesses of 1–2 mm. height to give the layer radiation refractive properties.

It will be obvious that the materials of the layers and the fillers may be widely varied within the general limitations given in this description. It has been found to be advantageous to use a packaging material sheet which is not continuous but is constituted by an apertured network or weave. If plywood is used, as in the examples, it is preferred to provide it with holes. If corrugated cardboard is used, considerable air spaces should preferably be provided. Loose basket weaves are also useful.

The packaging materials of the present invention provide an economical means for protecting stored articles, such as boxes, crates and cans, against radar detection since these materials match the radiated energy reflection of the surroundings.

What I claim is:

1. A package comprising (1) an object reflecting impinging electromagnetic waves having a wavelength between 0.1 and 50 cm., and (2) a packaging material enclosing the object whereby none of said waves may impinge thereon, said packaging material comprising (a) an absorber for said waves consisting of a wave reflecting base layer next to the object and an absorber layer superimposed on the reflecting base layer, the absorber layer having an outer boundary surface spaced from the base layer by at least approximately $$(2n-1)\lambda/4\sqrt{k'k_m'}$$

wherein $\lambda$ is the wavelength of the impinging waves in the absorber, $n$ is any positive integer, $k'$ is the relative dielectric constant and $k_m'$ is the relative permeability, the apparent dielectric constant of the absorber layer at the boundary surface being above 10, and (b) a cardboard sheet having a relative dielectric constant below 10, the cardboard sheet being a surface impedance matching layer of the absorber and having a surface impedance between the impedance of free space and the surface impedance of said absorber boundary surface, and the refractive index $r$ of the cardboard sheet is given by the formula $$r=\sqrt{r_1 r_2}$$

wherein $r_1$ is the refractive index of a material adjacent the outer surface of the sheet and $r_2$ is the refractive index of the material at the absorber layer boundary surface.

2. The package of claim 1, further comprising a protective covering layer over the cardboard sheet, the refractive index of the covering layer being below that of the cardboard sheet.

3. A package comprising (1) an object reflecting impinging electromagnetic waves having a wavelength between 0.1 and 50 cm., and (2) a packaging material enclosing the object whereby none of said waves may impinge thereon, said packaging material comprising (a) an absorber for said waves consisting of a wave reflecting base layer next to the object and an absorber layer superimposed on the reflecting base layer, the absorber layer having an outer boundary surface spaced from the base layer by at least approximately $$(2n-1)\lambda/4\sqrt{k'k_m'}$$

wherein $\lambda$ is the wavelength of the impinging waves in the absorber, $n$ is any positive integer, $k'$ is the relative dielectric constant and $k_m'$ is the relative permeability, the apparent dielectric constant of the absorber layer at the boundary surface being above 10, and (b) a plywood sheet having a relative dielectric constant below 10, the plywood sheet being a surface impedance matching layer of the absorber and having a surface impedance between the impedance of free space and the surface impedance of said absorber boundary surface, and the refractive index $r$ of the plywood sheet is given by the formula $$r=\sqrt{r_1 r_2}$$

wherein $r_1$ is the refractive index of a material adjacent the outer surface of the sheet and $r_2$ is the refractive index of the material at the absorber boundary surface.

4. The package of claim 3, further comprising a protective covering layer over the plywood sheet, the refractive index of the covering layer being below that of the plywood sheet.

5. A package comprising (1) an object reflecting impinging electromagnetic waves having a wavelength between 0.1 and 50 cm., and (2) a packaging material enclosing the object whereby none of said waves impinge thereon, said packaging material comprising (a) an absorber for said waves consisting of a wave reflecting base layer next to the object and an absorber layer superimposed on the reflecting base layer, the absorber layer having an outer boundary surface spaced from the base layer by at least approximately $$(2n-1)\lambda/4\sqrt{k'k_m'}$$

wherein $\lambda$ is the wavelength of the impinging waves in the absorber, $n$ is any positive integer, $k'$ is the relative dielectric constant and $k_m'$ is the relative permeability, the apparent dielectric constant of the absorber layer at the boundary surface being above 10, and (b) a roofing pulp sheet having a relative dielectric constant below 10, the roofing pulp sheet being a surface impedance matching layer of the absorber and having a surface impedance between the impedance of free space and the surface impedance of said absorber boundary surface, and the refractive index $r$ of the roofing pulp sheet is given by the formula $r=\sqrt{r_1 r_2}$, wherein $r_1$ is the refractive index of a material adjacent the outer surface of the sheet and $r_2$ is the refractive index of the material at the absorber boundary surface.

6. The package of claim 5, further comprising a protective covering layer over the roofing pulp sheet, the refractive index of the covering layer being below that of the roofing pulp sheet.

References Cited by the Examiner

UNITED STATES PATENTS

| | | | |
|---|---|---|---|
| 2,599,944 | 6/1952 | Salisbury | 343—18 |
| 2,656,535 | 10/1953 | Neher | 343—18 |
| 2,822,539 | 2/1958 | McMillan | 343—18 |
| 2,875,435 | 2/1959 | McMillan | 343—18 |

OTHER REFERENCES

Severin: "Nonreflecting Absorbers for Microwave Radiation," IRE Transactions on Antennas and Propagation, July 1956, AP4, No. 3, pp. 385–392.

RODNEY D. BENNETT, *Primary Examiner.*

CHESTER L. JUSTUS, *Examiner.*

L. MYERS, G. M. FISHER, B. L. RIBANDO,
*Assistant Examiners.*